(12) United States Patent
Okamoto et al.

(10) Patent No.: US 8,264,719 B2
(45) Date of Patent: Sep. 11, 2012

(54) IMAGE PROCESSING SYSTEM AND IMAGE PROCESSING METHOD IN WHICH SPECIFIC INFORMATION INCLUDING INFORMATION CONCERNING THE OWN APPARATUS IS ADDED TO IMAGE DATA AFTER EACH PROCESSING BY EACH COMPONENT/STEP THEREOF

(75) Inventors: Yuji Okamoto, Kyoto (JP); Shuhji Fujii, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1243 days.

(21) Appl. No.: 11/809,420

(22) Filed: Jun. 1, 2007

(65) Prior Publication Data
US 2007/0279704 A1 Dec. 6, 2007

(30) Foreign Application Priority Data
Jun. 5, 2006 (JP) ................................. 2006-156649

(51) Int. Cl.
*G06F 15/00* (2006.01)
*G06K 1/00* (2006.01)
(52) U.S. Cl. ...................... 358/1.15; 358/1.14; 358/1.9
(58) Field of Classification Search ................... 358/1.1, 358/1.9, 1.11–1.18
See application file for complete search history.

(56) References Cited

U.S. PATENT DOCUMENTS
2004/0258276 A1   12/2004   Ishii et al.
2007/0008572 A1 *  1/2007   Morikawa et al. ........... 358/1.15

FOREIGN PATENT DOCUMENTS
JP           05030239 A    2/1993
JP           2000-307845  11/2000
JP           2001-045271   2/2001
JP           200196860 A  10/2001

* cited by examiner

*Primary Examiner* — Thierry Pham
(74) *Attorney, Agent, or Firm* — Edwards Wildman Palmer LLP; David G. Conlin; David A. Tucker

(57) ABSTRACT

The output history of image data is made traceable when image data is processed while it is transmitted between an image processing apparatus and an external apparatus. The image processing apparatus adds specific information including information concerning the own apparatus to image data from a document. When specific information is added, either the form of writing specific information in header information of image data or the form of combining with an original image a specific image corresponding to specific information is selected. The image processing apparatus sends image data having added specific information to a management server, and the management server stores inputted image data. The management server adds information concerning the own apparatus to image data as specific information, and sends the image data to the image processing apparatus. The image processing apparatus adds information concerning the own apparatus to image data as specific information, and prints the image data. The added specific information includes information concerning the image processing apparatus and management server which have treated the image data.

5 Claims, 5 Drawing Sheets (a)

(b)

(c)

IMAGE PROCESSING SYSTEM AND IMAGE PROCESSING METHOD IN WHICH SPECIFIC INFORMATION INCLUDING INFORMATION CONCERNING THE OWN APPARATUS IS ADDED TO IMAGE DATA AFTER EACH PROCESSING BY EACH COMPONENT/STEP THEREOF

BACKGROUND OF THE INVENTION

1. Field of the Invention

The present invention relates to an image processing system in which an image processing apparatus and an external apparatus are connected through a network and the image processing apparatus and the external apparatus process image data using an application possessed by the external apparatus.

2. Description of the Related Art

An image processing apparatus is multifunctional and thus can perform operations such as copying, printing, scanning and facsimile. An image processing system has been built in which the image processing apparatus and an external apparatus such as a server and a personal computer are communicatively connected through a network.

For the image processing system, an external vendor develops applications concerning document management and task processes for managing and sharing image data. The application is installed in the external apparatus, and the application and the image processing apparatus operate in liaison.

Image data inputted in the image processing apparatus is outputted to the external apparatus, and the external apparatus stores the image data and manages the image data. Image data is outputted from the external apparatus to the image processing apparatus, and the image processing apparatus processes the image data and outputs the image data by printing, facsimile communication and the like. When image data is treated in accordance with an application as described above, the image data is transmitted between the image processing apparatus and the external apparatus through a network.

Specific information such as trace information is added to image data for preventing unauthorized use of an image. For example, by trace information, the output history of image data can be traced. In Japanese Patent Laid-Open No. 2002-342060, a print server adds specific information to image data, and a management server stores image data. A printer prints and outputs image data outputted from the management server. The outputted image has added specific information. In Japanese Patent Laid-Open No. 2002-57892, a personal computer adds specific information to image data read out by a scanner and outputs the image data to a printer. The printer prints and outputs the image having added specific information.

In an image processing system in which an image processing apparatus operates in accordance with an application, a plurality of apparatuses treat and process image data. However, when a specific apparatus such as a print server or a personal computer adds trace information as specific information, trace information is not added to image data if the image data is transmitted without passing though the specific apparatus. Consequently, the apparatus which has processed the image data cannot be identified, and the image data can be no longer traced, thus raising a problem in terms of security.

In view of the situation described above, an object of the present invention is to provide an image processing system with security improved by adding specific information such as trace information each time an image processing apparatus or an external apparatus processes image data.

SUMMARY OF THE INVENTION

The present invention provides an image processing system in which an image processing apparatus processing image data and an external apparatus having an application are communicatively connected through network, and the image processing apparatus and the external apparatus operate in accordance with the application, wherein the image processing apparatus and the external apparatus comprise an addition section adding specific information to image data when processing the image data in accordance with the application.

Thus, specific information is added in the image processing apparatus or the external apparatus each time image data is processed. Owing to the specific information, which apparatus has performed what processing can be identified, and the output history of image data can be traced.

For example, the image processing apparatus adds specific information including information concerning the own apparatus when processing and outputting inputted image data. The external apparatus adds specific information including information concerning the own apparatus when storing image data inputted from the image processing apparatus. The external apparatus outputs the image data having added specific information to the image processing apparatus. When printing and outputting image data including specific information, the image processing apparatus prints the image data with information concerning the own apparatus added to specific information.

When image data is finally printed and outputted, specific information includes information concerning the image processing apparatus which has inputted image data, the external apparatus, and the image processing apparatus which has printed image data. Namely, specific information is trace information.

The addition section combines specific information with image data as specific image data, or writes specific information in header information of image data. Either the former or the latter is selected according to the type of processing of image data. For example, when image data is printed and outputted, specific information is combined with image data. Thus, a specific image based on specific information is printed. When image data is sent and outputted, either the former or the latter may be selected.

According to the present invention, when the image processing apparatus and the external apparatus treat image data in liaison in accordance with an application, specific information is added each time the data is processed in each apparatus. The output history of image data can be traced based on the specific information. Therefore, even if image data is leaked through unauthorized use, an apparatus which was subjected to unauthorized use and a person who committed unauthorized use of the apparatus can be identified. Thus, security of an image processing system can be improved.

DETAILED DESCRIPTION OF THE PREFERRED EMBODIMENTS

Figure 1:
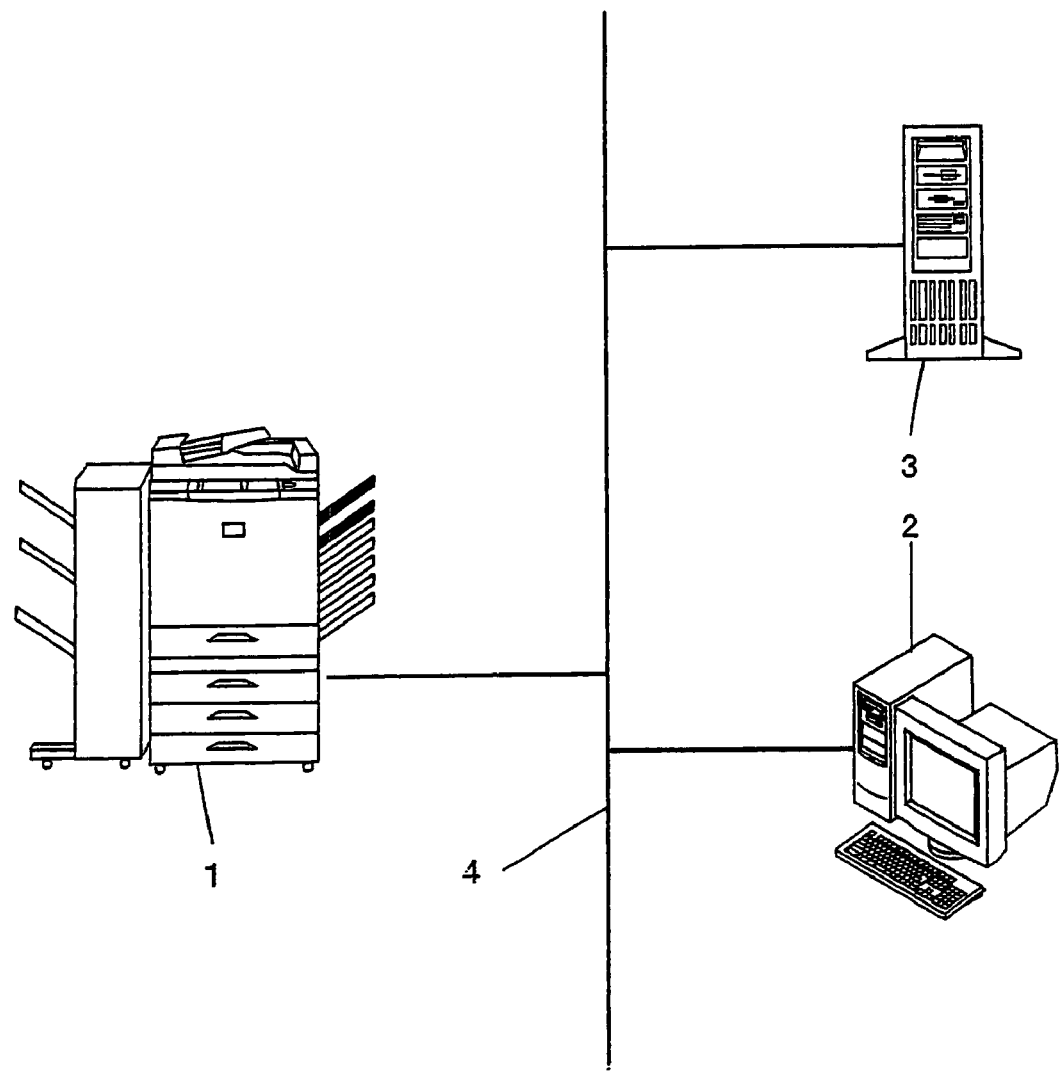
FIG. 1 shows a schematic configuration of an image processing system of the present invention.

An image processing system of this embodiment is shown in FIG. 1. The image processing system comprises an image processing apparatus 1 and external apparatuses such as a personal computer 2 and a server 3, and the image processing apparatus 1 and the external apparatus are connected through a network 4.

Figure 2:
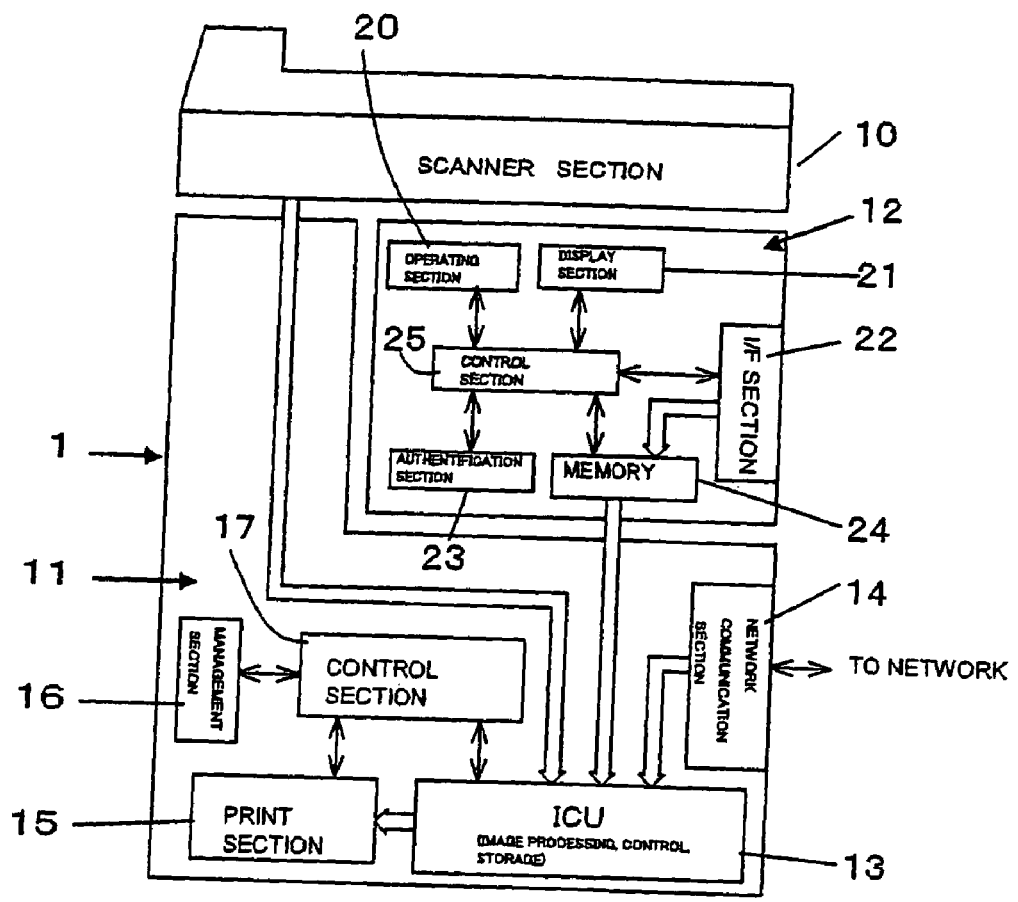
FIG. 2 shows a schematic configuration of an image processing apparatus.

As shown in FIG. 2, the image processing apparatus 1 is an MFP executing a copy mode, a print mode, a scanner mode and a facsimile mode, and has a scanner section 10 reading a document and inputting image data, an image data processing section 11 processing image data, and an information processing section 12 processing inputted information such as authentication information.

The image data processing section 11 has an image processing section 13 editing, storing and outputting inputted image data, a network communication section 14 carrying out data communication through the network 4, a print section 15 printing and outputting image data, a management section 16 storing control information, setting information and the like of the apparatus as a whole, and a device control section 17 responsible for control of the apparatus as a whole. The image processing section 13 has a hard disk drive and a memory storing image data.

The information processing section 12 has an operating section 20 for input operation, a display section 21 displaying an operation screen, an interface section 22 communicating with a mobile terminal device such as a USB device and an IC card, an authentication section 23 performing authentication for inputted authentication information, a memory 24 storing information such as authentication information, and a control section 25 processing inputted operation information and authentication information. Communication by the interface section 22 is not limited to wire communication but may be wireless communication.

The operating section 20 and the display section 21 are provided on an operation panel. The operating section 20 has various kinds of operation keys. The display section 21 consists of a liquid crystal display, and is in the form of a touch panel. Touch keys are formed in the operation screen displayed on the display section 21, and these keys also function as operation keys.

A plurality of image processing apparatuses 1 and a plurality of external apparatuses are connected to the network 4 such as a LAN and a WAN. The network 4 is connected to the Internet through a communication line such as a telephone line and optical fibers from a router. The image processing apparatus 1 has a modem apparatus (not shown), and can carry out data communication with a facsimile apparatus through a telephone line.

The image processing apparatus 1 is allowed to communicate with the external apparatus through the network 4 by a predetermined communication protocol. Similarly, the image processing apparatuses 1 are allowed to mutually communicate. In this connection, communication in the network 4 may be wire or wireless communication.

The external apparatus sends image data to the image processing apparatus 1 through the network 4. The network communication section 14 of the image processing apparatus 1 receives and inputs image data. In the case of the facsimile communication, the modem apparatus of the image processing apparatus 1 inputs image data. Image data is also inputted from the scanner section 10.

When image data is inputted, the device control section 17 performs processing in any of a print mode, a copy mode, a scanner mode and a facsimile mode based on processing conditions included in input information from the operating section 20 and header information of the inputted image data. In the print mode and the copy mode, image processing of image data is carried out in the image processing section 13, and then the image is printed on a recording sheet by the print section 15. In the scanner mode, image data is stored on the hard disk drive, and the image data is sent to the external apparatus through the network communication section 14 in response to a call from the external apparatus. In the facsimile mode, image data is sent to the facsimile apparatus through the modem apparatus.

The external apparatus has various kinds of applications associated with the image processing apparatus 1. The external apparatus carries out processing appropriate to the application, and operates the image processing apparatus 1 in accordance with the application. Therefore, in the image processing system, the application of the external apparatus and the image processing apparatus 1 can be operated in liaison. The image processing apparatus 1 can not only carry out apparatus-specific processing but also perform various kinds of customized functions by the application.

The application has been developed by an external vendor, and one or more applications are installed in each external apparatus. Processing performed by the application includes processing related to image processing such as color conversion, resolution conversion, scaling, RET and discrimination of specific images, processing related to transmission processing such as time-designated transmission and broadcasting processing, processing related to document processing such as file management, OCR and translation, and processing related to operability such as setting and switching of functions of the image processing apparatus 1, job programming and customization of operations.

A system using such an application is referred to as an OSA (Open Systems Architecture). In the OSA, Web service is performed using an SOAP. Using the SOAP, communication using an HTTP, an HTTPS, an FTP and a TCP/IP is carried out between the external apparatus and the image processing apparatus 1.

The communication is carried out by the control section consisting of a CPU in the external apparatus, and by the device control section 17 in the image processing apparatus 1. The control section and the device control section 17 operate in accordance with a predetermined program, and thereby carry out communication using the SOAP to send and receive a message. The SOAP is a protocol for calling data and a service on the basis of the XML, HTTP and the like, and can provide an instruction for control.

This image processing system treats image data in accordance with the application, and therefore improves security for image data to protect information possessed by the image. For this purpose, the image processing apparatus 1 and the external apparatus add specific information each time image data is processed.

The device control section 17 of the image processing apparatus 1 has an addition section adding specific information to image data, and an output section outputting image data having added specific information. The control section of the external apparatus also has an addition section and an output section.

Here, the specific information added is information including information concerning the own apparatus. The information concerning the own apparatus is information concerning an apparatus which has processed image data, and includes trace information, apparatus information and user information. The trace information includes a date and time when image data was processed, a file name, an apparatus name, an apparatus ID, information concerning a source from which image data is inputted, information concerning a destination to which image data is outputted, and information concerning a user. The apparatus information includes an apparatus name and an apparatus ID. The user information relates to a user who instructed processing, and includes a user ID. The trace information includes apparatus information and user information. Part of the information is registered in a nonvolatile memory. When image data is processed, other information is automatically prepared.

When processing image data, the addition section reads out or prepares specific information, and adds the specific information to the image data. At this time, forms of addition include two forms: combining specific information as an image with the processed image and adding specific information as data to image data.

When specific information is combined with the image, the addition section controls the image processing section 13, so that a specific image appropriate to specific information is prepared and specific image data of the specific image is combined with processed image data. The combined image data is stored in the hard disk drive. This addition form is suitable when processing is carried out in the copy mode and print mode in which image data is outputted as an image. When specific information is added to image data, the addition section writes specific information in header information of image data. Image data including specific information is stored in the hard disk drive. This addition form is suitable when processing is carried out in the scanner mode and facsimile mode in which image data is processed as data.

The output section reads out image data having added specific information from the hard disk drive, carries out image processing by operating the image processing section 13 according to a designated mode, then prints the image data and outputs the image data by data transmission. When image data is printed, the specific image corresponding to specific information is combined with the image corresponding to processed image data, and the combined image is printed by the print section 15.

Figure 3:
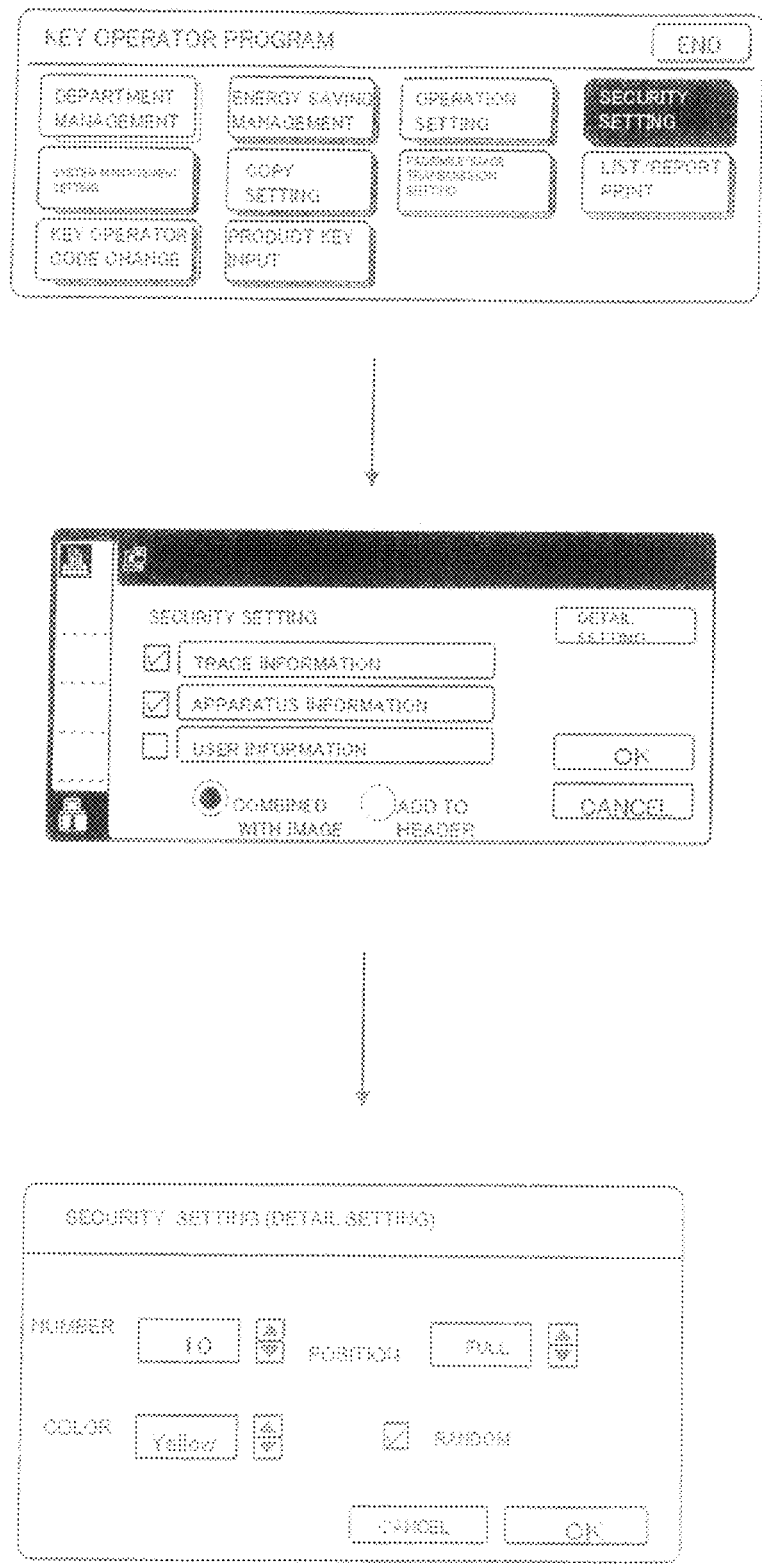
FIG. 3 shows a setting screen of specific information.

Two forms of addition are selectable. Namely, as shown in FIG. 3, when a security setting is selected in the setting screen displayed on the display section 21 of the operation panel, a setting screen for specific information is displayed. The user can first select information to be added as specific information, and select the form of addition. When specific information is combined with an image, conditions for formation of a specific image can be set.

In this connection, the device control section 17 may automatically select the form of addition according to a mode for processing. In the case of the copy mode or print mode, the form of combining an image is selected, and in the case of the scanner mode or facsimile mode, the form of addition to image data is selected. In the case of the application of performing image processing to deform an image such as scaling of image, an added specific image is also deformed, and specific information cannot be detected. When such image processing is carried out, the form of addition to image data is selected.

The control section of the external apparatus has a similar addition section, and stores image data having added specific information in a storage device such as a hard disk drive. The output section sends image data having added specific information.

Figure 4:
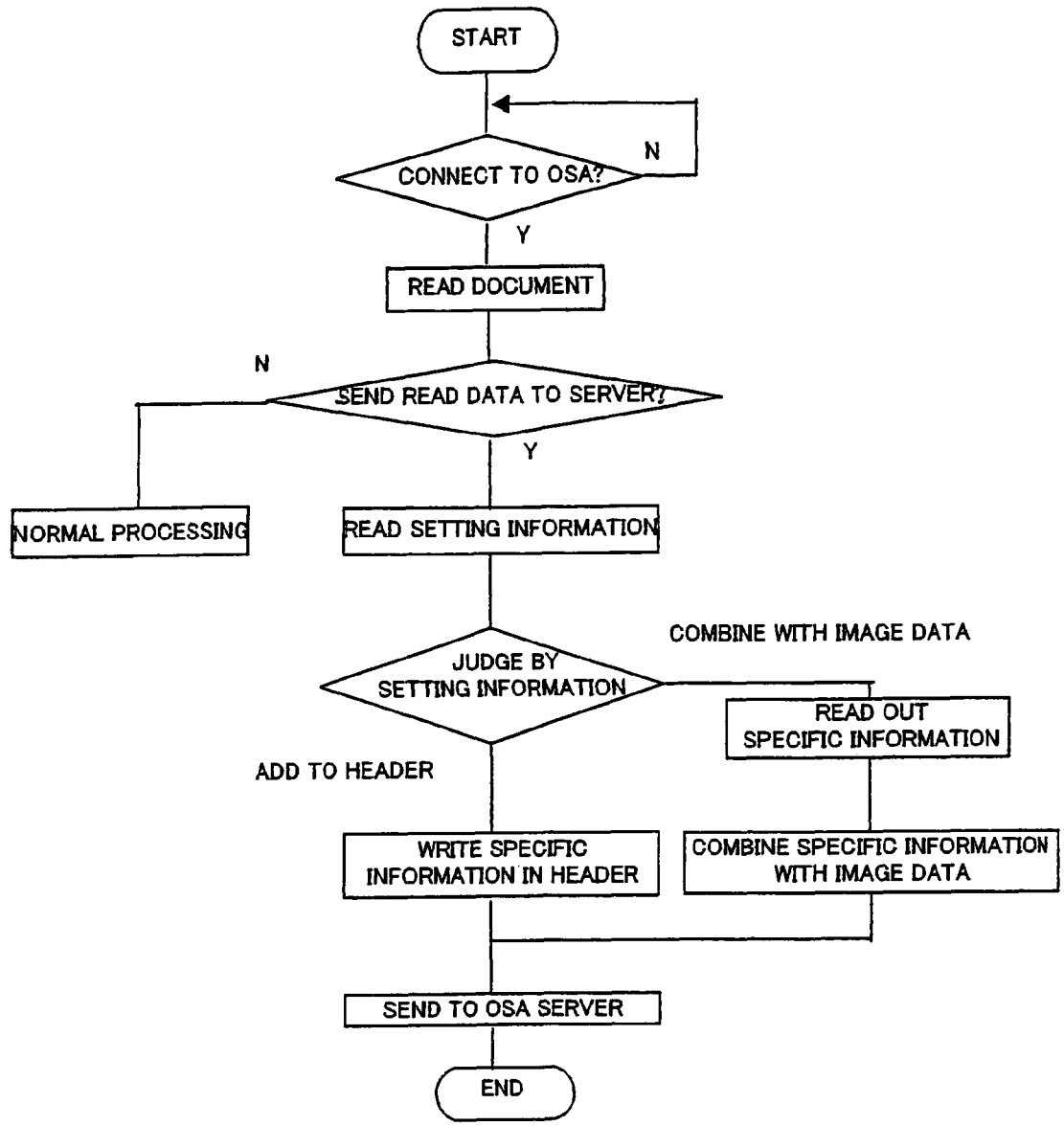
FIG. 4 is a flowchart when specific information in the image processing apparatus is added to image data.

Operations of the image processing apparatus 1 when the user carries out processing an application will now be described with reference to FIG. 4. The device control section 17 of the image processing apparatus 1 authenticates the user with the inputted ID and password of the user. When it is ensured that the user has been registered, the device control section 17, based on a selected application, accesses the external apparatus having the application to start communication.

In this application, a document is read, image data is stored in the management server (OSA server), and the image data is printed and outputted. The scanner section 10 of the image processing apparatus 1 reads the document and inputs image data of an original image. The device control section 17 determines whether image data is to be sent to the management server. Namely, whether the processing is processing by the application or not is determined. If it is not processing by the application, but apparatus-specific processing, normal processing is carried out.

If it is processing by the application, the device control section 17 reads out setting information concerning addition of specific information from the nonvolatile memory, and adds specific information to image data according to the setting. When specific information is combined with the image, the device control section 17 combines specific image data with image data, and stores the combined image data in the hard disk drive. When specific information is added to image data, the device control section 17 writes specific information in header information of image data, and stores image data having added specific information in the hard disk drive. Here, specific image data is combined with image data, since image data is printed and outputted by the application.

The device control section 17 sends image data having added specific information to the management server. The control section of the management server stores inputted image data in the storage device.

When image data having added specific information is printed and outputted, the control section of the management server sends image data to the designated image processing apparatus 1. At this time, the control section adds specific information concerning the own apparatus to image data. Namely, specific image data is combined with image data. The control section sends the combined image data.

Figure 5:
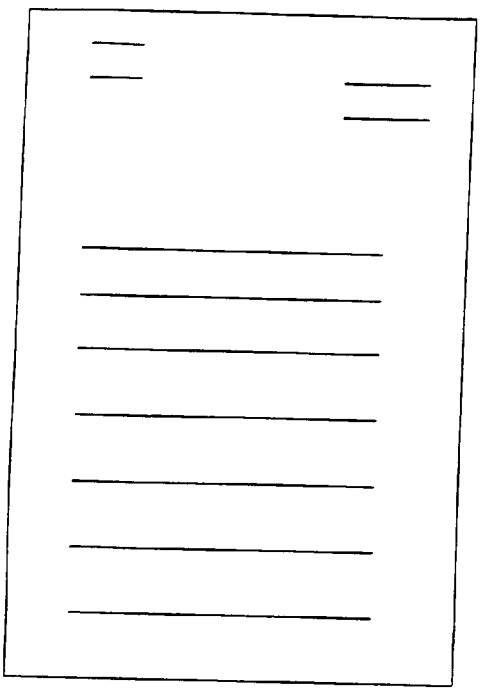
FIG. 5(A) shows an original image.
FIG. 5(B) shows a specific image.
FIG. 5(C) shows a combined image.
Figure 5:
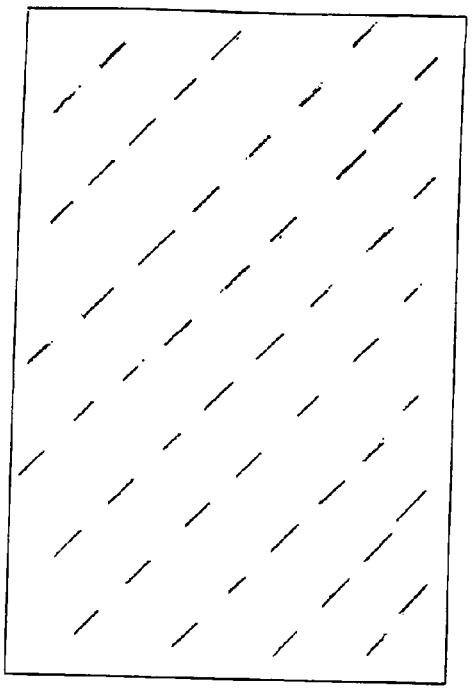
Figure 5:
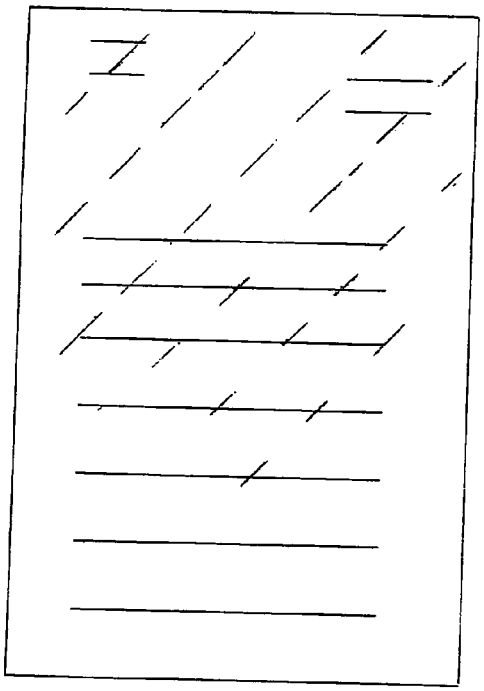

When image data having added specific information is inputted to the image processing apparatus 1, the image processing apparatus 1 prints and outputs image data. When image data is printed, the device control section 17 combines specific information concerning the own apparatus as a specific image with image data to which specific image data has been inputted. Namely, a specific image shown in FIG. 5(B) is combined with an original image obtained by reading a document shown in FIG. 5(A), and the combined image shown in FIG. 5(C) is printed and outputted.

Specific information represented by this specific image includes information concerning the image processing apparatus 1 which has read the document, information concerning the external apparatus such as the management server, and information concerning the image processing apparatus 1 which has carried out printing. By detecting and analyzing specific information added to image data, the output history of image data can be traced.

Therefore, when the image processing apparatus 1 and the external apparatus treat image data in liaison in accordance with the application, image data is outputted with specific information added each time image data is processed. Thus, a user, an image processing apparatus and an external apparatus that have treated image data can be identified. If confidential information is leaked due to illegal copy, its origin can be identified and unauthorized use can be revealed, leading to an improvement in security.

The present invention is not limited to the embodiment described above. Of course, many modifications and changes can be made to the embodiment within the scope of the present invention. The image processing apparatus may be a multiple function apparatus having a copy mode and a facsimile mode, or may be a dedicated apparatus having a single mode, such as a copier, a printer or a scanner.

Specific information is not limited to trace information, but may be regulation information for regulating an output to image data, such as copy inhibition, image communication inhibition and designation of print conditions. Regulation information and trace information may be combined.

What is claimed is:

1. An image processing system in which an image processing apparatus processing image data and an external apparatus having an application are communicatively connected through a network, and the image processing apparatus and the external apparatus process and output image data in accordance with the application, wherein:

the image processing apparatus and the external apparatus each respectively comprise an addition section adding specific information, wherein the specific information is trace information including operational history and identification information of own apparatus, to image data when processing the image data in accordance with the application, wherein:

the addition section of the image processing apparatus writes specific information in header information of image data when processing/transmitting image data to the external apparatus, creates a specific image in accordance with the specific information and combines the specific image with image data when processing/transmitting image data to the external apparatus to process/print the image data, and creates a specific image in accordance with specific information and combines the specific image with image data when processing/printing image data transmitted from the external apparatus, and wherein:

the addition section of the external apparatus writes specific information in header information of image data when processing/transmitting image data to the image processing apparatus or another external apparatus, and creates a specific image in accordance with the specific information and combines the specific image with the image to be transmitted when processing/transmitting image data to be printed by the external apparatus to the image processing apparatus.

2. The image processing system according to claim 1, wherein when printing and outputting image data including specific information of the image processing apparatus and the external apparatus, the image processing apparatus prints the image data with information concerning the own apparatus added to the specific information.

3. The image processing system according to claim 1, wherein when storing inputted image data and outputting the stored image data to the image processing apparatus, the external apparatus adds specific information including information concerning the own apparatus.

4. An image processing method in which an image processing apparatus and an external apparatus are communicatively connected through a network, and the image processing apparatus and the external apparatus process and output image data in accordance with an application, wherein:

the image processing apparatus and the external apparatus respectively add specific information, wherein the specific information is trace information including operational history and identification information of own apparatus, to the image data when processing image data in accordance with the application, wherein: the image processing apparatus writes specific information in header information of the image data when processing/transmitting image data to the external apparatus, creates a specific image in accordance with the specific information and combines the specific image with the image data when processing/transmitting the image data to the external apparatus to process/print the image data, and creates a specific image in accordance with the specific information and combines the specific image with the image data when processing/printing the image data transmitted from the external apparatus, and, wherein:

the external apparatus writes specific information in header information of the image data when processing/transmitting the image data to the image processing apparatus or the external apparatus, and creates a specific image in accordance with the specific information and combines the specific image with the image to be transmitted when processing/transmitting image data to be printed by the external apparatus to the image processing apparatus.

5. The image processing method according to claim 4, wherein when printing and outputting image data to which specific information of the image processing apparatus and the external apparatus are added, the image processing apparatus adds specific information including information concerning the own apparatus to image data, and prints the image data including specific information.

* * * * *